United States Patent [19]
Schwartz

[11] 3,878,365
[45] Apr. 15, 1975

[54] METHOD AND APPARATUS FOR SPOT CHECKING A CHECKOUT CASHIER OPERATION IN A STORE

[76] Inventor: Hermann Schwartz, Schutzenstrasse 18, Pfaffikon, Switzerland

[22] Filed: Oct. 26, 1973

[21] Appl. No.: 410,013

[30] Foreign Application Priority Data
Nov. 3, 1972 Switzerland.................. 16059/72

[52] U.S. Cl. ...... 235/61.7 R; 235/61.9 R; 235/91 L
[51] Int. Cl.......................... G06k 5/00; G06k 15/02
[58] Field of Search ... 235/61.11 E, 61.7 R, 61.9 R, 235/61.7 B, 91.14

[56] References Cited
UNITED STATES PATENTS
| | | | |
|---|---|---|---|
| 2,919,851 | 1/1960 | Otis.............................. | 235/61.9 R |
| 3,681,570 | 8/1972 | Abt............................... | 235/61.7 R |
| 3,734,286 | 5/1973 | Simjian...................... | 235/61.11 E |

*Primary Examiner*—Daryl W. Cook
*Attorney, Agent, or Firm*—Flynn & Frishauf

[57] ABSTRACT

A sequence of random pulses is produced by the arrival of customers to a checkout line, where each customer feeds information plates related to items he has purchased to an automatic checkout register. Clock pulses of shorter duration and higher frequency are generated and coincidence of a clock pulse and a customer-initiated pulse is detected to provide a pulse that initiates a spot check operation. The spot check operation blocks the normal use of the automatic checkout register without interfering with its calculating circuits and requires the customer to proceed to a manual checkout counter where his purchases are checked out and paid for in the usual manual checkout fashion. Unknown to the customer, the automatic and manual checkout results are compared and the discrepancies are referred either immediately or on a record to appropriate administration personnel, promptly releasing the automatic checkout register to serve the next customer.

12 Claims, 3 Drawing Figures

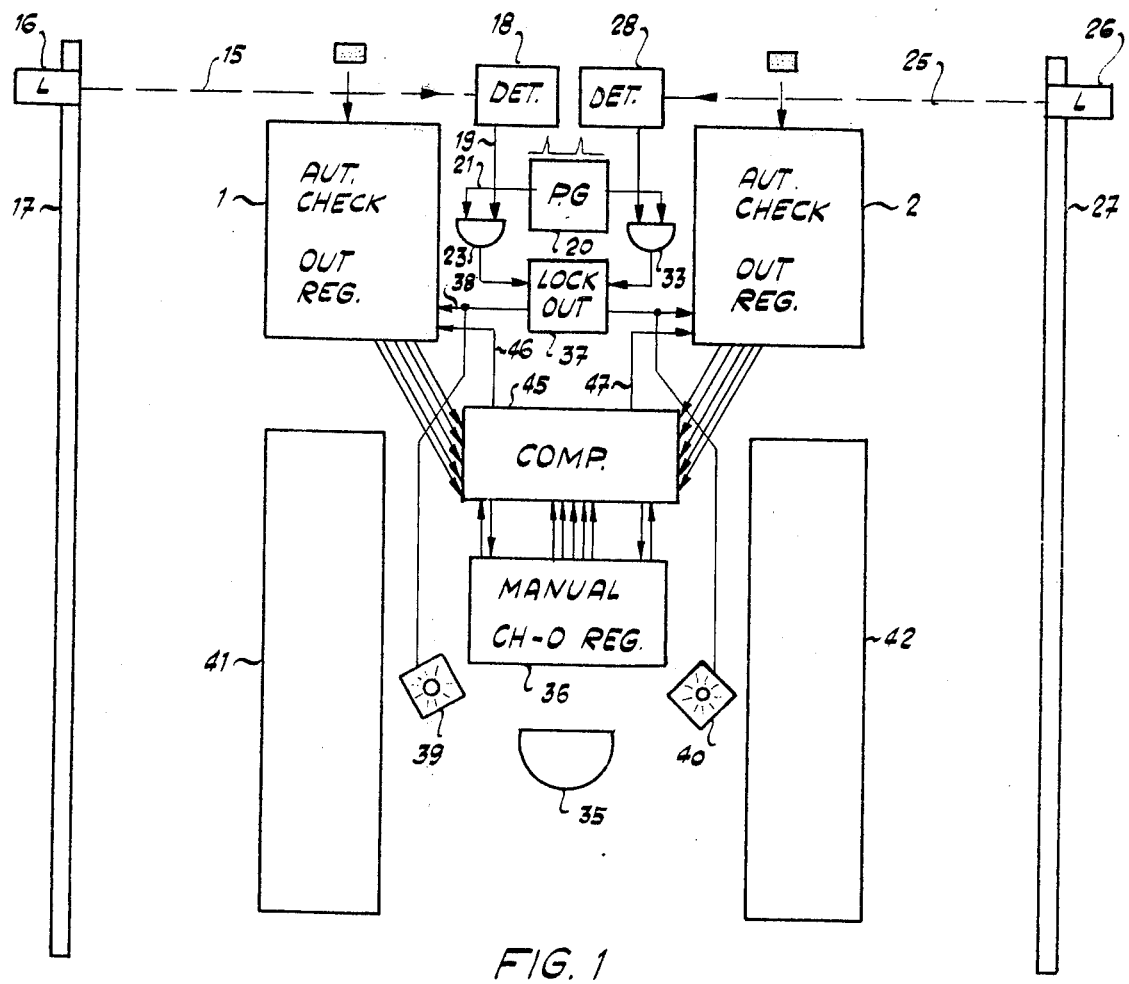
FIG. 1
FIG. 2
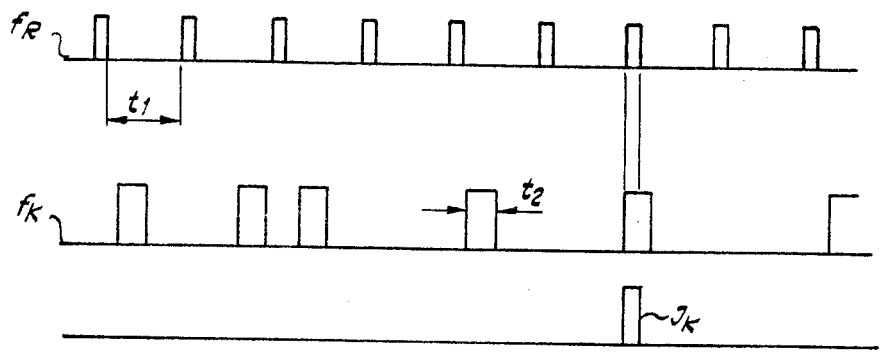

METHOD AND APPARATUS FOR SPOT CHECKING A CHECKOUT CASHIER OPERATION IN A STORE

This invention relates to a method and apparatus for performing a spot check of the cashier operation of a self-service store, such as a department store, in which the purchased articles have corresponding information carriers, such as price plates, cards, or the like, which are fed into an automatic checkout register supplying at least the prices of each of the selected articles to be purchased and calculating and displaying or printing out at least the amount to be paid by the customer.

It has already become common to use the well-known supermarket procedures in certain types of department stores, allowing the customer to collect the articles he desires to purchase in a shopping cart and pay for them at a checkout counter. The checkout operation has been simplified by the use of separable tags or tag portions identifying the article and giving its price, which the cashier can detach and enter on the register. The use of machine-readable detachable tags still further simplifies the checkout operation and makes it possible to collect information at the same time for inventory control as well as for cash register purposes, while at the same time saving the time of visually reading off the prices. The cashier operation is then simply reduced to making change for the total price, after which the customer can proceed to packing table where he can put his purchases in shopping bags or have them otherwise packed.

When machine-readable detachable tags are used in the manner just mentioned, the customer must detach a tag from every article and hand them to the cashier station where they are put in a reading device and the total price, including applicable sales tax, is computed. The use of machine-readable tags is convenient for the administration of price changes and if the tags can be marked cancelled by the automatic register, they can be given to the customer for use in exchanges or in a claim for a refund if an article proves to be unsatisfactory or subject to a mistake. On the other hand, if the information tags or plates are kept by the store, while the customer is given a printout for a sales slip, the tags may be reused and the opportunities for shoplifters to imitate them for substitution purposes may be reduced. Separate information plates are even better suited for automatic registers than separable tag portions.

The cashier's position in the operation above-described is provided with electronic means for reading the information plates, computing the total amount due and, normally, printing out a sales slip. It may also dispense coins when change is made. Already mentioned, the information reader may also collect information for inventory control purposes.

As the checkout operation is improved in the manner above-described, it becomes more and more necessary to provide checks that will avoid mistakes and will defeat attempts to cheat. A system of spot checking the operation is usually a sufficient safeguard. What needs to be checked is whether in fact the corresponding information plate for each article taken through the checkout line is supplied to the cashier or to the automatic register. Not only must there be as many carrier plates as articles, but the carrier plates must be the ones that correspond to the articles and not some other carrier plate that has by error or dishonesty become associated with the wrong article. Furthermore, it is necessary that the spot checking should not be done in such a way that the person singled out for the spot check is put to any embarrasment, and for that purpose it is better not to have the store personnel select the particular customers to be checked. It is accordingly an object of the present invention to provide a reliable and efficient method and effective apparatus, for performing spot checks of the checkout and cashier operations of a self-service store which, in particular, will take account of the individual rights and privacy interests of the customers of such a store.

SUBJECT MATTER OF THE PRESENT INVENTION

Briefly, a random selection of the customers to be checked is provided by utilizing the coincidence of one of a series of pulses generated by unwitting action of the customers as they proceed to the checkout operation and one of a series of pulses generated within the apparatus. Because selection in this form is completely at random, the selecton of customers for spot checking can have no invidious connotations and the privacy and personality rights of the customers are fully respected. The cashier or checkout operator receives a signal not visible to the customer selected for a spot check, who is then simply required to put the articles on a checkout counter in the normal way, for them to be checked out manually by a cashier or operator who reads the prices directly from the articles and punches the amounts in manually on a register or other input device. The final sum formed by the manual checkout is then compared with the corresponding amount in the automatic checkout register that has read the information plates. The selection of the customer for spot check may operate to prevent the automatic checkout register from completing its function by displaying the total and printing out of a sales slip, so that the customer may be led to believe that the automatic register has suffered a temporary malfunction and attaches no significance to the fact that he has been required to go through normal manual checkout. Such isolated conventional check-outs at the cashier position will not disturb the customer personally, since the procedure is not declared to be or indicated as a test or integrity check.

Naturally, the occasional conventional checkout procedure will briefly slow up the passage of customers past the cashier's position. This effect is quite insignificant, however, since a spot check of about five percent of the customers is normally regarded as sufficient, so that ninety-five percent of all customers can be quickly handled by the cashiers, and so that the advantage of the use of machine-readable information plates or cards and automatic checkout registers can almost be fully obtained.

Since the customers subject to spot check pay for their purchases, the cashier does not have to be concerned with what discrepancies are occasionally recorded between the operation of the manual and the automatic check-out register. If the two sums fail to match, however, it may be worthwhile to provide a signal to the checkout cashier so that the addition may be repeated, in order to make sure that it was not an error in the manual operation that caused the discrepancy. Any further information regarding the discrepancies is best recorded and it may be convenient to display in some central position some basic information about the discrepancy, such as the dollar amount and sign and whether there was also a discrepancy in the number of items, and if so what. In a central location this would be identified with the particular cashier's position. It would also be noted whether the discrepancy persisted on a repetition of the manual checkout.

To carry out the random selection of a customer for spot check, pulse generator providing a basic pulse sequence with the repetition frequency $f_R$, which may conveniently be a steady frequency, is provided in the electronic apparatus of the checkout system. This frequency is substantially higher than the average rate of passage of the customers through the checkout operation, preferably very much higher. It may, for example, be a frequency of 50 Hz, providing an interpulse interval $t_1$ between successive pulses of almost 20 milliseconds. The customers set off a random series of pulses as they proceed to the cashier's position, either by interrupting a light beam, operating a floor contact by walking past, or initiating a pulse in a required action preliminary to making the automatic checkout register ready for accepting information from plates (which may at the same time serve to assure that the automatic register is reset to zero before it accepts a new series of information plates). The system for providing these random pulses preferably should provide just one pulse per customer, but that may be done in the case of a floor plate by disregarding a second pulse within a certain time of a first one, for example. The pulse set off by the individual customer is so generated that it has a fixed duration $t_2$. The pulse train thus generated has a relatively very low and practically aperiodic frequency characteristic that may be represented by the symbol $f_K$. It is therefore left fully to chance when a pulse of duration $t_2$ should be present at the same time as one of the pulses of the basic frequency $f_R$. If these two pulse sequences of frequencies $f_R$ and $f_K$ are applied to a logic circuit (basically an AND-gate), for each such coincidence a control pulse $J_K$ is provided for the spot check operation. When this happens the input of the electronic automatic checkout device can be blocked, for example, so that it will accept no information plates until the manual checkout has been completed, or the operation of the automatic checkout device can be interrupted at some other stage with the information plates already in it, so that the comparison can be immediately made as soon as the manual punching in of information is complete.

If desired, the control pulse $J_K$ can be used to operate a directional gate or a switch for a shopping cart so as to lead the customer in question to a particular checkout position that operates only manually.

Coincidence occurrence such as generate the pulses $J_K$ are entirely unpredictable, as already mentioned. In other words, they occur in a fully random fashion and are therefore completely impartial and neutral with respect to various customers. If $t_1$ equals 20ms and $t_2$ equals 1ms, a ratio of 20:1 holds, so that in spite of the random nature of the sequence of pulses $J_K$, over a large number of customers $f_K$, on the average the customers selected for a spot check will constitute five percent of the customers. By variation of the width of $t_1$ or $t_2$, the desires percentage of spot checking can be set to any desired value.

Since a person familiar with the spot check operation cannot predict the incidence of the next spot check in any line, either by the number of customers or by the time lapse, it is not possible, even for customers knowing the system, to plan in advance for avoidance of the spot check. The described system of selecting spot check subjects makes it possible, of course, that several spot checks will suddenly follow closely one after another and, conversely, that at times there will be long periods without any spot check and also that there will be phases of the process with approximately even distribution of spot checking.

The invention is described by way of example with reference to the annexed drawing, in which:

FIG. 1 is a block diagram of one form of checkout position utilizing the method and apparatus of the invention;

FIG. 2 is a pulse timing diagram explaining the operation of the invention; and

Figure 3:
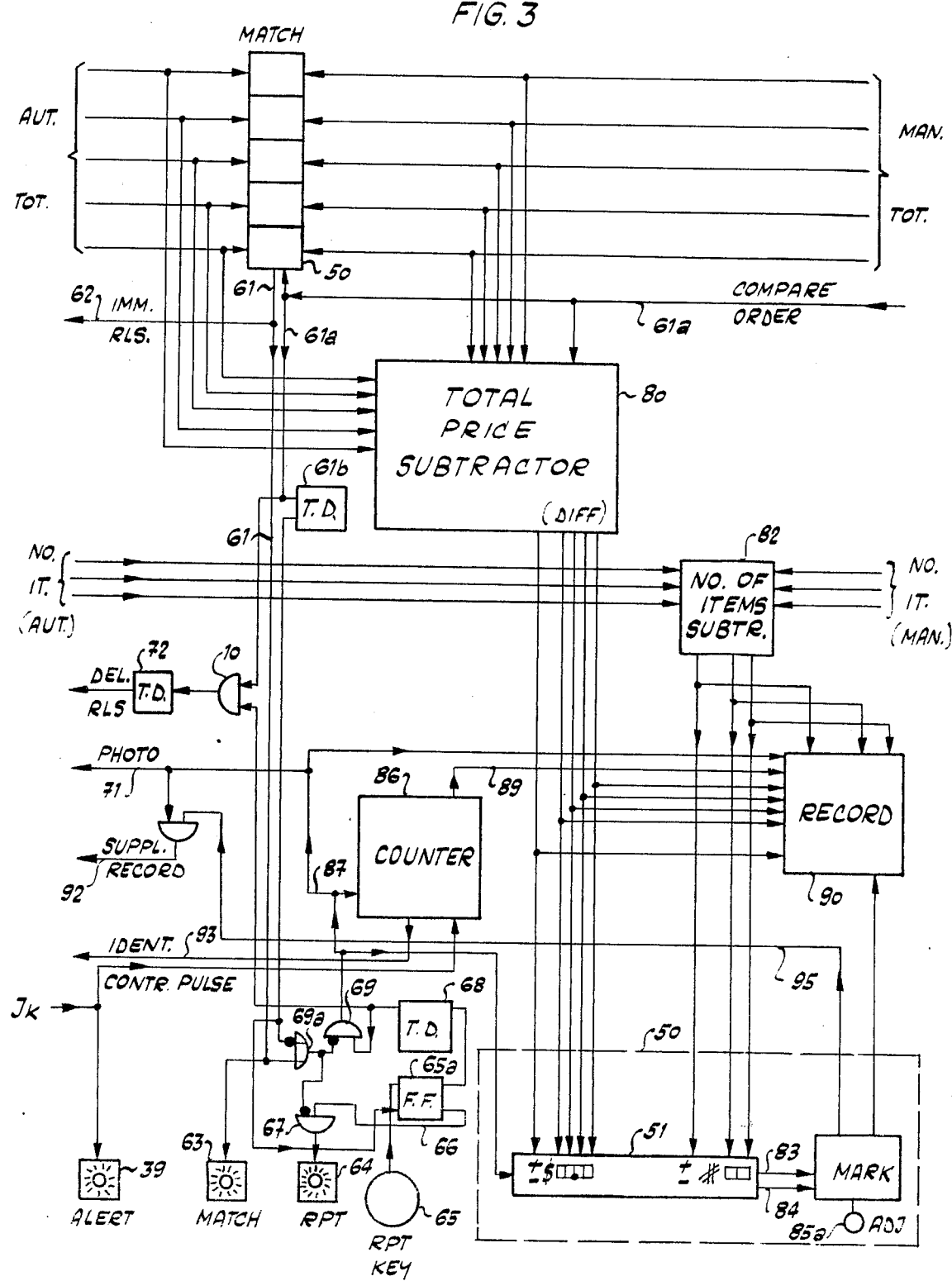
FIG. 3 is a more detailed block diagram of one form of electronic system in accordance with the invention.

The basic principle of the invention has already been explained. FIG. 1 and FIG. 3 illustrate some additional features that may be used in connection with the invention, for purposes of showing the variety of ways in which the invention may be utilized.

FIG. 1, for example, illustrates how a single manual checkout position can be used with a plurality of automatic checkout registers subject to spot checks, in this illustration two of the latter. As shown in FIG. 1, automatic checkout registers 1 and 2 are arranged to be operated by customers respectively entering aisles 11 and 12. Customers entering aisle 11 interrupt a light beam 15 between a projector 16 mounted on an aisle divider 17 and a photoelectric detector 18 which provides a pulse on its output lead 19 when the light beam is interrupted. A timing circuit (not shown) prevents a second pulse being produced within one or a few seconds of the beginning of an interruption of the light beam that triggers a pulse. A pulse generator 20 provides a steady series of reference pulses of very short duration (one or a few microseconds) at the rate of 50 Hz supplied over an output lead 21 to a coincidence circuit 23, to which the lead 19 from the detector 18 is also connected.

The aisle 12 is similarly provided with a light projector 26 on a partition 27, a detector 28 and a coincidence circuit 33 which has one of its inputs supplied by the previously mentioned pulse generator 20 and the other supplied by the detector 28.

In order to prevent the checkout cashier at the position 35, who operates the manual checkout register 36, from being expected to take care of the concurrently arising spot check operations on both of the aisles 11 and 12, a lockout circuit 37 is provided so that when one of the coincidence circuits 23 and 33 provides a pulse to the lockout circuit 37, that pulse is transmitted to the related automatic checkout register, but for a predetermined period thereafter no pulses from the other of the coincidence circuits is permitted to reach its related automatic checkout register. Pulses from the coincidence circuit 23 passing through the lockout circuit 37 are supplied to the automatic checkout register 1 over the connection 38 and such impulse is also used to turn on the signal light 39 to alert the checkout cashier to the fact that a manual checkout operation is necessary. The signal light 40 is similarly provided to alert the checkout cashier to the fact that a manual checkout is needed on the aisle 12.

It must not be assumed that when a manual checkout is being performed for a customer in aisle 11, the flow of customers in the aisle 12 is interrupted. There would normally be two cashiers, one for each aisle, and if one cashier can handle the output of more than one automatic register, then each aisle can be provided with two automatic checkout registers instead of only one as shown in FIG. 1. Either cashier can serve either aisle, so that the cashier at the manual checkout register can serve whichever aisle needs a spot check, while the other one takes care of the other aisle.

When a control pulse is provided to one of the automatic checkout registers, the automatic register is prevented from completing its function and the manual checkout operator is alerted to the need for a manual checkout. This operator will ask the customer to proceed to one of the manual checkout tables 41 and 42 and, if desired, a legend can also be lighted with a similar message. The automatic register results are furnished to the comparator circuit 45 and when the manual checkout operation is complete, its results are likewise furnished to the comparator circuit 45. If the results match, the automatic checkout register is unblocked over one of the leads 46 or 47 and the checkout operator is made aware of that fact, either by the action of the automatic checkout register or by a suitable light signal (63 in FIG. 3). If no match is received, a signal light is activated as described below in connection with FIG. 3 that signifies that a repeated manual checkout is desired. As further described in connection with FIG. 3, regardless of the outcome of the comparison following the repeated manual checkout, the automatic checkout register is released, but at least in this case it does not display a total or print a slip in a manner visible to the customer. Indeed, since the manual checkout operation provides a slip and displays a total, even when a match is found, and the automatic checkout register is unblocked, the display may be supressed and no printout externally provided, the unblocking serving merely to reset the automatic register to prepare it for the next customer.

FIG. 2 shows, at the top, the pulse train $f_R$ produced by the pulse generator 20. On the second line of FIG. 2 are shown the 1 millisecond pulses of the irregular pulse train $f_K$ produced by the arrival of customers. The third line of FIG. 2 shows the generation of a control pulse $J_K$ when pulses of the two previous series coincide in time.

FIG. 3 illustrates the circuits of the comparator 45 when it is provided in a form that not only determines whether the manual checkout agress with the automatic check-out, but furnishes information to a central location for dealing with discrepancies revealed by the spot check procedure.

The dashed line 50 encloses indicating equipment which may be at a central location, such as a head cashier's location or an assistant manager's location.

A match-seeking comparator 60 simply compares the digits of the total price calculated by the automatic check out register, shown as coming from the left of the diagram, with the corresponding total from the manual checkout register, shown as being connected from the right of the diagram. The output 61 merely indicates whether or not these total figures match. The comparison may be made in any way, either with binary numbers or with each decimal digit represented in bcd code or in some other way. Such comparator circuits are well-known. Over the connection 62 a signal indicating a match is provided to the automatic checkout register in question for immediately releasing the blocking thereof and allowing it to proceed to serve another customer. The output 61 also operates signal lights 63 and 64 to indicate to the manual checkout operator whether a match has been obtained or whether a repetition of the manual checkout must be made. If a repetition is required, the operator operates a repeat key 65 which mechanically or electrically resets the manual checkout register 36 (FIG. 1) and also sets the flipflop 65a, thereby extinguishing the lamp 64 by blocking the AND-gate 67, deenergizing the connection 66 while activating a time delay circuit 68. The delayed repeat signal goes to an AND-gate 69. By this time the manual checkout register 36 (FIG. 1) has been reset and the compare order signal transmitted by its total key (not shown) over the line 61a has been terminated by the resetting operation. The absence of a compare order prevents the output of the OR-gate 69a from interpreting the absence of a match as a mismatch signal. When the new manual total is ready, if there is again a mismatch, the AND-gate 69 will produce a repeat-mismatch signal on the conductor 87, activating the indicator 51, the recording device 90 and also, over the connection 71, an automatic camera such as is used in check cashing installations. A release signal is provided after the repeated comparison regardless of outcome, but it may be further delayed by the time delay circuit 72 in order that the results of the second comparison may be utilized before the automatic checkout register is reset.

Most of the remainder of the apparatus shown in FIG. 3 is for the purpose of enabling a head cashier or an assistant manager to deal with discrepancies revealed by the spot check. Of course the invention can be used without these particular provisions. For example, when there is a discrepancy, a special printout of the manual and of the automatic checkout registers can be marked with the time or some other identifying symbol, such as a serial number, and these records may be evaluated. The system of FIG. 3 is designed to provide condensed information in case it is desired to react without delay, particularly where the central position can observe the various checkout positions, either directly or by closed circuit television.

For this purpose a subtractor circuit 80 is provided which will subtract the smaller of the checkout totals from the larger and indicate the difference and also the sign, the sign meaning which of the two was larger. It may be convenient to use a negative sign to indicate that the automatic checkout device had the lower total, and a positive sign to indicate that it had the higher total. Another subtractor 82 is provided to compare the number of items added by the automatic and manual checkout registers and similarly to indicate the difference and the sign of the difference. The outputs of the subtractors 80 and 82 are furnished to the display device 50. Preferably they are displayed only for the repeated comparison, upon activation by a signal from the AND-gate 69.

On the basis of this display, it can be quickly seen whether the discrepancy is large or small and whether it involved the provision of an erroneous information plate or the failure to feed in one or more information plates. It may be desired to keep a record of all discrepancies found by spot check, but, by way of example, in FIG. 3 a mark control 85 is provided for selecting which discrepancies will be recorded. The mark control 85 may be a manual key, but preferably it is a control provided with inputs 83 and 84 indicating the magnitude of the discrepancy and the sign and arranged to provide a mark signal when the discrepancy exceeds a dollar amount that may be set on the mark control 85a, provided the sign is at the same time negative (in the sense above proposed). Of course if there is more than one manual spot check position, the identity of the spot check position will be shown in addition to the items shown at 50 in FIG. 3, unless a separate display is provided corresponding to each position and so identified. If common display and recording means 50,90 is used for several spot check positions, sequencing circuits will be necessary to prevent interference between concurrent operations.

As mentioned in connection with FIG. 1, each spot check trigger pulse $J_K$ lights an alert lamp 39 or 40 at the manual checkout operator's position, indicating in which aisle a manual checkout is required. These trigger pulses are also provided in the circuit at FIG. 3 to a counter 86. It is not strictly necessary to count all of the spot check initiating pulses, since statistics will only be needed regarding the instances in which a match is not obtained. On the other hand, it may be desired to know in what proportion of tests a match was not obtained. If it is not desired to know this proportion, instead of the counter 86 a clock might be used to identify the various discrepancy results by the time of day. If desired, they may be identified both by a serial count, such as provided by the counter 86, and by the time of day (the time of day being provided by means not shown but well understood). Over the connection 87 the repeated failure to find a match is signalled to the counter. The counter 86 serves to give each discrepancy a serial number. The trigger pulses $J_K$ may be counted separately from the mismatches in the counter 86 and the two counts compared (for example, on an analog basis) to furnish a ratio. The identifying serial number of the event is furnished over the connection 89 to a recording device 90 and also over the connection 93 to an external supplemental recording device.

The recording device 90 merely makes a record on a convenient medium, such as a printout, a punched tape or care or a magnetic tape, of the discrepancy information already described, but preferably only for those discrepancies selected by the mark control 85, each discrepancy being identified by the serial number furnished by the counter (which may have digits added to it to indicate the time of day). If it is desired to have a complete comparison of the items and prices totaled up in the automatic and manual checkout registers in the case of a discrepancy this may be obtained by causing the two registers to record all the data normally printed on the sales slip, which means that these registers must be equipped with the necessary memories, either electronic or in the form of a duplicate sales slip roll. This is done over the connection 92 and of course in this case the time delay circuit 72 must provide sufficient delay to allow this operation to be completed before the automatic checkout register is reset for its next operation. To identify this particular discrepancy record, the counter 86 provides an identifying serial number over the connection 93.

For the purposes of FIG. 3, it is assumed that the operation of a photographic device over the connection 71 will be comanded for every discrepancy, but of course this could also be limited to those discrepancies selected by the mark control 85, as in the case of a recording device 90. A separate control connection 95 is shown between the mark device and the circuit 92 commanding the provision of a supplementary record. This serves to indicate that the mark device 85 may advantageously set a higher criterion for commanding a supplementary record, which would be accordingly made in a smaller number of cases.

Although the invention has been described in connection with particular embodiments, it is to be understood that many variations and modifications may be made within the inventive concept For example, the supplementary record output 92 of FIG. 3 may be used to deposit the set of information plates of the transaction contained in the automatic register into a separate bin for future reference, at the same time making a record connecting the deposit bin with the serial number identifying the transaction provided over the connection 93.

As another example, it is quite immaterial whether the serial number provided by the counter 86 over its outputs 89 and 93 is the count, at that moment, of the control pulses $J_K$ (which can repeat every hour or every day) or whether it is a separate count of the number of discrepancies, which can be a cumulative count over a long period.

I claim:

1. Method of spot checking the cashier operation of a self-service store in which information carriers, each pertaining to a purchased article, are fed to an automatic register by the customer to provide a summary of at least the prices of said articles and the total price, which method consists of the steps of:

generating a pulse in response to the time of passage of each customer or to the time of a required action by each customer on the way to a cashier position, thereby providing a random first series of pulses;

generating a second series of pulses without giving a detectable sign thereof to customers in the store;

generating a coincidence signal whenever a pulse of said second series is present during a pulse of said first series;

making a manual register checkout of the purchases of the customer whenever a customer is identified by the generation of said coincidence signal, said manual checkout being made with reference to price indications remaining on the purchased articles, and comparing the total provided by said manual checkout with a total produced by said automatic register.

2. Method as defined in claim 1 which also includes the steps of:

blocking said automatic register when one of said coincidence pulses is generated, and unblocking said automatic register after comparing the total provided by said manual check with the total produced by said automatic register.

3. Method as defined in claim 2 in which the step of unblocking said automatic register includes the steps of:

unblocking said register automatically when the manual register checkout results in a total matching the total produced by said automatic register, and unblocking said automatic register after a non-matching manual checkout by operating a control switch that also causes a record to be made of at least the failure to match.

4. Method as defined in claim 2 in which the step of blocking said automatic register prevents the provision of a display or printout normally provided by said automatic register and does so in a manner not easily distinguisable from a mechanical or electrical malfunction and in which the unblocking step suppresses at least part of the visible indications normally produced by said register.

5. Method as defined in claim 1 in which the pulses of said second series have a relative steady frequency of at least twice the average frequency of pulses of said first series under the most busy expectable condition.

6. Method as defined in claim 1 in which pulses of said first series are of a first uniform duration, and pulses of said second series are of a second uniform duration which is substantially shorter than the duration of pulses of said first series.

7. Method as defined in claim 1 in which pulses of said first series are triggered by the time of passage of a customer by a place on his way to a cashier position.

8. Apparatus for spot checking the cashier operation of a self-service store in which information carriers, each pertaining to a purchased article, are fed to an automatic register by the customer to provide a summary of at least the prices of said articles and the total price, comprising:

means for generating a pulse in response to passage of each customer or in response to required action by each customer on his way to a cashier position, thereby providing a random first series of pulses;

pulse generating means for producing a second series of pulses;

gate means for producing a coincidence signal whenever a pulse of said second series is present during a pulse of said first series;

means responsive to said coincidence signal for blocking the normal output display or printout of said automatic register, and means operated by a manual checkout means for comparing at least one result produced by said automatic register with a corresponding result produced by said manual checkout means.

9. Apparatus as defined in claim 8 in which said comparing means indicates the result of the comparison to the operator of said manual checkout means, automatically clears said automatic register for further operation upon the comparison resulting in a match and prepares for clearance of said automatic register means after subsequent operation of a control switch when said comparison does not result in a match.

10. Apparatus as defined in claim 9 in which said comparing means is arranged to display to a monitoring office the amount and sign of the discrepancy when it fails to find a match.

11. Apparatus as defined in claim 10 in which said control switch prepares said comparator for a repeated comparison with a repeated manual checkout, in which said display is either not made or is made in modified form prior to completion of said repeated comparison, and in which operation of said control switch also prepares for release of said automatic register upon completion of said repeated comparison.

12. Apparatus as defined in claim 10 in which said comparison means is arranged to display to said monitoring office a discrepancy in number of items registered.

* * * * *